United States Patent [19]
Brooks et al.

[11] Patent Number: 5,587,935
[45] Date of Patent: Dec. 24, 1996

[54] INTEGRATED SOFTWARE DEVELOPMENT SYSTEM INCLUDING GROUP DECISION SUPPORT SUBSYSTEM, APPLICATION DEVELOPMENT SUBSYSTEM, AND BRIDGE SUBSYSTEM THEREBETWEEN

[75] Inventors: Jeffrey S. Brooks, Greene; Stephen L. Dohanich, Vestal, both of N.Y.

[73] Assignee: International Business Machines Corporation, Armonk, N.Y.

[21] Appl. No.: 812,598

[22] Filed: Dec. 23, 1991

[51] Int. Cl.$^6$ .................................................. G06F 17/00
[52] U.S. Cl. ............................................................ 364/578
[58] Field of Search ........................... 364/505, DIG. 1, 364/DIG. 2, 578; 395/922

[56] References Cited

U.S. PATENT DOCUMENTS

| | | | |
|---|---|---|---|
| 4,713,775 | 12/1987 | Scott et al. | 395/922 |
| 4,809,170 | 2/1989 | Leblang et al. | 364/DIG. 1 |
| 4,841,441 | 6/1989 | Nixon et al. | 364/401 |
| 4,951,192 | 8/1990 | Chase, Jr. et al. | 364/DIG. 1 |
| 5,008,853 | 4/1991 | Bly et al. | 364/DIG. 2 |
| 5,075,847 | 12/1991 | Fromme | 395/700 |
| 5,170,465 | 12/1992 | McKeeman et al. | 364/DIG. 1 |
| 5,233,513 | 8/1993 | Doyle | 364/401 |

OTHER PUBLICATIONS

"End–User Computing In A CASE Environment" J. Info. Syst. Management; vol. 8, No. 2 pp. 17–21; C. Lin et al (1991).

"Validation Of A Knowledge–Based System: The ICE Case", Proceedings Of The Twenty–Third Annual Hawaii International Conference On Systems Sciences, 1990, vol. 3, pp. 239–246.

*Primary Examiner*—Ellis B. Ramirez
*Attorney, Agent, or Firm*—Richard M. Goldman

[57] ABSTRACT

Disclosed is an integrated system for creating a process model and writing software based on the process model. The integrated system includes three subsystems, a group decision support subsystem, an applications development subsystem, and a bridge subsystem. The group decision support subsystem is used for creating and ordering a process model according to a protocol. The application development subsystem is used for writing software based on the output of the group decision support subsystem. The bridge subsystem converts the output of the group decision support subsystem to compatible input of the application development subsystem.

1 Claim, 18 Drawing Sheets

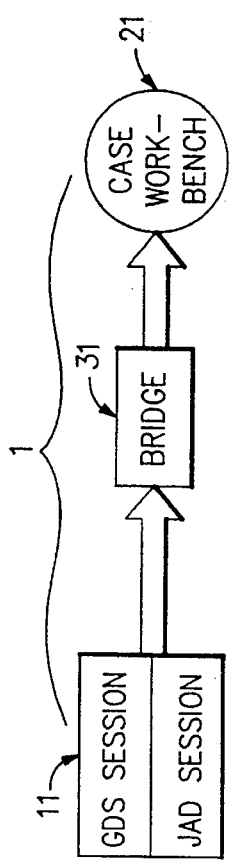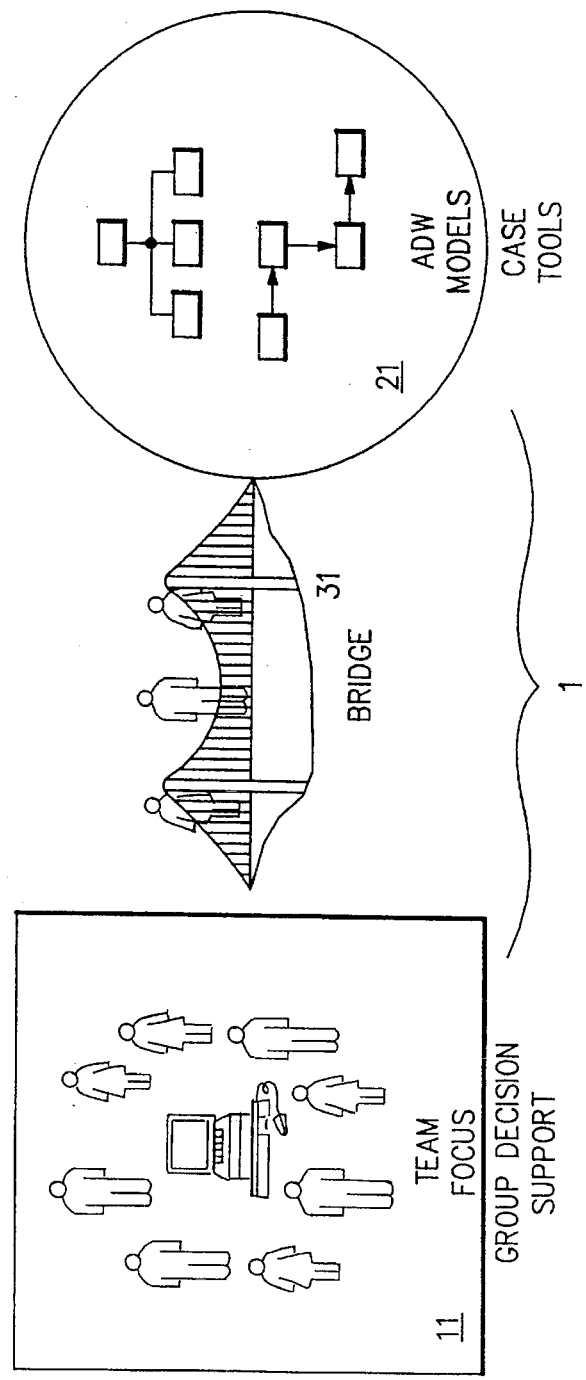

```
/*******************************************************************/
/*                                                                 */
/* PROGRAM NAME:   REXXBRG.CMD                                     */
/*                                                                 */
/* ABSTRACT: This program is designed to read the output from      */
/*           the TeamFocus Idea Org. tools and convert the output  */
/*           into an ADW (Application Dev. Workbench) importable   */
/*           data fromat.                                          */
/*                                                                 */
/*                                                                 */
/*                                                                 */
/*                                                                 */
/*                                                                 */
/*                                                                 */
/*                                                                 */
/*******************************************************************/
ECHO OFF
/*******************************************************************/
/* The next section of the program creates the four files which    */
/* will be imported into ADW.  These files are empty at this       */
/* time.                                                           */
/*******************************************************************/
PATH = STREAM(AI.EXP,C,'QUERY EXISTS')
IF PATH = "THEN DO
   TEST = STREAM(AI.EXP,C,O)    /* Create an empty AI.EXP by opening */
   TEST = STREAM(AI.EXP,C,C)    /* then closing the file*/
END
PATH = STREAM(PI.EXP,C,'QUERY EXISTS')
IF PATH = "THEN DO
   TEST = STREAM(PI.EXP,C,O)    /* Create an empty PI.EXP by opening */
   TEST = STREAM(PI.EXP,C,C)    /* then closing the file*/
END
PATH = STREAM(OI.EXP,C,'QUERY EXISTS')
IF PATH = "THEN
   TEST = STREAM(OI.EXP,C,O)    /* Open OI.EXP for work */
PATH = STREAM(TI.EXP,C,'QUERY EXISTS')
IF PATH = "THEN           /* Open TI.EXP for work */
   TEST = STREAM(TI.EXP,C,O)
/*                     */
/* Initialize counters and Variables */
/*                     */
CNT = '0'
NUM = 100001
NUMERIC DIGITS(11)
TOKEN = 10000000000
PROP_CODE = 30076
```

FIG.3A

```
/********************************************************/
/* This next section scans the directory for possible object  */
/* files (.IO files saved from TeamFocus). If any are found   */
/* codes specific to that object are stored in variables,     */
/* and the BUILDER routine is called to disect the object file. */
/*                                                        */
/* ADW Object Types & Corresponding File Names:           */
/*                                                        */
/*    Critical Assumption    CRASS.IO                     */
/*    Critical Success Factor CRFAC.IO                    */
/*    Data Collection        DATA_COL.IO                  */
/*    Data Flow              DATA_FLS.IO,INPUTS,OUTPUTS.IO */
/*    Data Store             DATA_STR.IO                  */
/*    DBD                    DBD.IO                       */
/*    Entity Type            ENTITY.IO                    */
/*    External Agent         EXTERNAL.IO                  */
/*    File Database          FILE_DB.IO                   */
/*    File Record            FILE_REC                     */
/*    Function               FUNCTION.IO                  */
/*    Goal                   GOALS.IO                     */
/*    Information Need       INFO_NDS.IO                  */
/*    Library                LIBRARY.IO                   */
/*    Location               LOCATION.IO                  */
/*    Mechanism              MECHISM.IO                   */
/*    Modeling Source        MODELING SOURCE.IO           */
/*    Module                 MODULE.IO                    */
/*    Organizational Unit    ORG_UNIT.IO                  */
/*    Problem                PROBLEM.IO                   */
/*    Process                PROCESS.IO                   */
/*    Project                PROJECT.IO                   */
/*    PSB                    PSB.IO                       */
/*    Relation               RELATION.IO                  */
/*    Relation Database      REL_DB.IO                    */
/*    Screen                 SCREEN.IO                    */
/*    Segment                SEGMENT.IO                   */
/*    Sequential Process     SEQ_PROC.IO                  */
/*    Subject Area           SUBJECT.IO                   */
/*                                                        */
/********************************************************/
PATH = STREAM(LOCATION.IO,C,'QUERY EXISTS')
IF PATH = < >"THEN DO
   TEST = STREAM(LOCATION.IO,C,0)
   PATH = STREAM(LOCATION.HIS,C,'QUERY EXISTS')
   IF PATH = "THEN
      TEST = STREAM(LOCATION.HIS,C,0)
   OBJ_TYPE = 10026
```

FIG.3B

```
    OBJ_NAME = 1
    CALL BUILDER
    TEST = STREAM(LOCATION.IO,C,C)
    TEST = STREAM(LOCATION.HIS,C,C)
    FOUND = 1
    RENAME 'LOCATION.IO LOCATION.DIO'
END
PATH = STREAM(ORG_UNIT.IO,C,'QUIERY EXISTS')
IF PATH < >"THEN DO
    TEST = STREAM(ORG_UNIT.IO,C,0)
    PATH = STREAM(ORG_UNIT.HIS,C,'QUERY EXISTS')
    IF PATH = "THEN
        TEST = STREAM(ORG_UNIT.HIS,C,0)
    OBJ_TYPE = 10010
    OBJ_NAME = 2
    CALL BUILDER
    TEST = STREAM(ORG_UNIT.IO,C,C)
    TEST = STREAM(ORG_UNIT.HIS,C,C)
    FOUND = 1
    RENAME 'ORG_UNIT.IO *.DIO'
END
PATH = STREAM(FUNCTION.IO,C,'QUERY EXISTS')
IF PATH = < >"THEN DO
    TEST = STREAM(FUNCTION.IO,C,0)
    PATH = STREAM(FUNCTION.HIS,C,'QUERY EXISTS')
    IF PATH = "THEN
        TEST = STREAM(FUNCTION.HIS,C,0)
    OBJ_TYPE = 10058
    OBJ_NAME = 3
    CALL BUILDER
    TEST = STREAM(FUNCTION.IO,C,C)
    TEST = STREAM(FUNCTION.HIS,C,C)
    FOUND = 1
    RENAME 'FUNCTION.IO *.DIO'
END
PATH = STREAM(PROCESS.IO,C,'QUERY EXISTS)
IF PATH < >"THEN DO
    TEST = STREAM(PROCESS.IO,C,0)
    PATH = STREAM(PROCESS.HIS,C,'QUERY EXISTS')
    IF PATH = "THEN
        TEST = STREAM(PROCESS.HIS,C,0)
    OBJ_TYPE = 10000
    OBJ_NAME = 4
    CALL BUILDER
    TEST = STREAM(PROCESS.IO,C,C)
```

FIG.3C

```
    TEST = STREAM(PROCESS.HIS,C,C)
    FOUND = 1
    RENAME 'PROCESS.IO *.DIO'
END
/******************************************************************/
/* Inputs, outputs, and data flows refer to same ADW object type,*/
/* data flows.  Different names gives facilitator flexibility in */
/* naming the object file.                                       */
/******************************************************************/
PATH = STREAM(INPUTS.IO,C,'QUERY EXISTS')
IF PATH < >"THEN DO
    TEST = STREAM(INPUTS.IO,C,O)
    PATH = STREAM(INPUTS.HIS,C,'QUERY EXISTS')
    IF PATH = "THEN
        TEST = STREAM(INPUTS.HIS,C,O)
    OBJ_TYPE = 10008
    OBJ_NAME = 5
    CALL BUILDER
    TEST = STREAM(INPUTS.IO,C,C)
    TEST = STREAM(INPUTS.HIS,C,C)
    FOUND = 1
    RENAME 'INPUTS.IO *.DIO'
END
PATH = STREAM(OUTPUTS.IO,C,'QUERY EXISTS')
IF PATH < >"THEN DO
    TEST = STREAM(OUTPUTS.IO,C,O)
    PATH = STREAM(OUTPUTS.HIS,C,'QUERY EXISTS')
    IF PATH = "THEN
        TEST = STREAM(OUTPUTS.HIS,C,O)
    OBJ_TYPE = 10008
    OBJ_NAME = 11
    CALL BUILDER
    TEST = STREAM(OUTPUTS.IO,C,C)
    TEST = STREAM(OUTPUTS.HIS,C,C)
    FOUND = 1
    RENAME 'OUTPUTS.IO *.DIO'
END
PATH = STREAM(DATA_FLS.IO,C,'QUERY EXISTS')
IF PATH < >"THEN DO
    TEST = STREAM(DATA_FLS.IO,C,O)
    PATH = STREAM(DATA_FLS.HIS,C,'QUERY EXISTS')
    IF PATH = "THEN
        TEST = STREAM(DATA_FLS.HIS,C,O)
    OBJ_TYPE = 10008
    OBJ_NAME = 6
    CALL BUILDER
```

FIG.3D

```
    TEST = STREAM(DATA_FLS.IO,C,C)
    TEST = STREAM(DATA_FLS.HIS,C,C)
    FOUND = 1
    RENAME 'DATA_FLS.IO *.DIO'
END
PATH = STREAM(GOALS.IO,C,'QUERY EXISTS')
IF PATH < >"THEN DO
    TEST = STREAM(GOALS.IO,C,O)
    PATH = STREAM(GOALS.HIS,C,'QUERY EXISTS')
    IF PATH = "THEN
        TEST = STREAM(GOALS.HIS,C,O)
    OBJ_TYPE = 10030
    OBJ_NAME = 7
    CALL BUILDER
    TEST = STREAM(GOALS.IO,C,C)
    TEST = STREAM(GOALS.HIS,C,C)
    FOUND = 1
    RENAME 'GOALS.IO *.DIO'
END
PATH = STREAM(PROBLEM.IO,C,'QUERY EXISTS')
IF PATH < >"THEN DO
    TEST = STREAM(PROBLEM.IO,C,O)
    PATH = STREAM(PROBLEM.HIS,C,'QUERY EXISTS')
    IF PATH = "THEN
        TEST = STREAM(PROBLEM.HIS,C,O)
    OBJ_TYPE = 10031
    OBJ_NAME = 8
    CALL BUILDER
    TEST = STREAM(PROBLEM.IO,C,C)
    TEST - STREAM(PROBLEM.HIS,C,C)
    FOUND = 1
    RENAME 'PROBLEM.IO *.DIO'
END
PATH = STREAM(SUBJECT.IO,C,'QUERY EXISTS')
IF PATH < >"THEN DO
    TEST = STREAM(SUBJECT.IO,C,O)
    PATH = STREAM(SUBJECT.HIS,C,'QUERY EXISTS')
    IF PATH = "THEN
        TEST = STREAM(SUBJECT.HIS,C,O)
    OBJ_TYPE = 10013
    OBJ_NAME = 9
    CALL BUILDER
    TEST = STREAM(SUBJECT.IO,C,C)
    TEST = STREAM(SUBJECT.HIS,C,C)
    FOUND = 1
    RENAME 'SUBJECT.IO *.DIO'
```

FIG.3E

```
END
PATH = STREAM(EXTERNAL.IO,C,'QUERY EXISTS')
IF PATH < >"THEN DO
  TEST = STREAM(EXTERNAL.IO,C,O)
  PATH = STREAM(EXTERNAL.HIS,C,'QUERY EXISTS')
  IF PATH = "THEN
    TEST = STREAM(EXTERNAL.HIS,C,O)
  OBJ_TYPE = 10002
  OBJ_NAME = 10
  CALL BUILDER
  TEST = STREAM(EXTERNAL.IO,C,C)
  TEST = STREAM(EXTERNAL.HIS,C,C)
  FOUND = 1
  RENAME 'EXTERNAL.IO *.DIO'
END
PATH = STREAM(CRASS.IO,C,'QUERY EXISTS')
IF PATH < >"THEN DO
  TEST = STREAM(CRASS.IO,C,O)
  PATH = STREAM(CRASS.HIS,C,'QUERY EXISTS')
  IF PATH = "THEN
    TEST =  STREAM(CRASS.HIS,C,O)
  OBJ_TYPE = 10039
  OBJ_NAME = 12
  CALL BUILDER
  TEST = STREAM(CRASS.IO,C,C)
  TEST = STREAM(CRASS.HIS,C,C)
  FOUND = 1
  RENAME 'CRASS.IO *.DIO'
END
PATH = STREAM(CRFAC.IO,C,'QUERY EXISTS')
IF PATH < >"THEN DO
  TEST = STREAM(CRFAC.IO,C,O)
  PATH = STREAM(CRFAC.HIS,C,'QUERY EXISTS')
  IF PATH = "THEN
    TEST = STREAM(CRFAC.HIS,C,O)
  OBJ_TYPE = 10040
  OBJ_NAME = 13
  CALL BUILDER
  TEST = STREAM(CRFAC.IO,C,C)
  TEST = STREAM(CRFAC.HIS,C,C)
  FOUND = 1
  RENAME 'CRFAC.IO *.DIO'
END
PATH = STREAM(DATA_COL.IO,C,'QUERY EXISTS')
IF PATH < >"THEN DO
  TEST = STREAM(DATA_COL.IO,C,O)
```

FIG.3F

```
    PATH = STREAM(DATA_COL.HIS,C,'QUERY EXISTS')
    IF PATH = "THEN
       TEST = STREAM(DATA_COL.HIS,C,0)
    OBJ_TYPE = 10029
    OBJ_NAME = 14
    CALL BUILDER
    TEST = STREAM(DATA_COL.IO,C,C)
    TEST = STREAM(DATA_COL.HIS,C,C)
    FOUND = 1
    RENAME 'DATA_COL.IO *.DIO'
END
PATH = STREAM(DATA_STR.IO,C,'QUERY EXISTS')
IF PATH < >"THEN DO
    TEST = STREAM(DATA_STR.IO,C,0)
    PATH = STREAM(DATA_STR.HIS,C,'QUERY EXISTS')
    IF PATH = "THEN
       TEST = STREAM(DATA_STR.HIS,C,0)
    OBJ_TYPE = 10012
    OBJ_NAME = 15
    CALL BUILDER
    TEST = STREAM(DATA_STR.IO,C,C)
    TEST = STREAM(DATA_STR.HIS,C,C)
    FOUND = 1
    RENAME 'DATA_STR.IO *.DIO'
END
PATH = STREAM(DBD.IO,C,'QUERY EXISTS')
IF PATH < >"THEN DO
    TEST = STREAM(DBD.IO,C,0)
    PATH = STREAM(DBD.HIS,C,'QUERY EXISTS')
    IF PATH = "THEN
       TEST = STREAM(DBD.HIS,C,0)
    OBJ_TYPE = 10033
    OBJ_NAME = 16
    CALL BUILDER
    TEST = STREAM(DBD.IO,C,C)
    TEST = STREAM(DBD.HIS,C,C)
    FOUND = 1
    RENAME 'DBD.IO *.DIO'
END
PATH = STREAM(ENTITY.IO,C,'QUERY EXISTS')
IF PATH < >"THEN DO
    TEST = STREAM(ENTITY.IO,C,0)
    PATH = STREAM(ENTITY.HIS,C,'QUERY EXISTS')
    IF PATH = "THEN
       TEST = STREAM(ENTITY.HIS,C,0)
    OBJ_TYPE = 10007
```

FIG.3G

```
      OBJ_NAME = 17
      CALL BUILDER
      TEST = STREAM(ENTITY.IO,C,C)
      TEST = STREAM(ENTITY.HIS,C,C)
      FOUND = 1
      RENAME 'ENTITY.IO *.DIO'
    END
    PATH = STREAM(FILE_DB.IO,C,'QUERY EXISTS')
    IF PATH < >"THEN DO
      TEST = STREAM(FILE_DB.IO,C,0)
      PATH = STREAM(FILE_DB.HIS,C,'QUERY EXISTS')
      IF PATH = "THEN
        TEST = STREAM(FILE_DB.HIS,C,0)
      OBJ_TYPE = 10056
      OBJ_NAME = 18
      CALL BUILDER
      TEST = STREAM(FILE_DB.IO,C,C)
      TEST = STREAM(FILE_DB.HIS,C,C)
      FOUND = 1
      RENAME 'FILE_DB.IO *.DIO'
    END
    PATH = STREAM(FILE_REC.IO,C,'QUERY EXISTS')
    IF PATH < >"THEN DO
      TEST = STREAM(FILE_REC.IO,C,0)
      PATH = STREAM(FILE_REC.HIS,C,'QUERY EXISTS')
      IF PATH = "THEN
        TEST = STREAM(FILE_REC.HIS,C,0)
      OBJ_TYPE = 10054
      OBJ_NAME = 19
      CALL BUILDER
      TEST = STREAM(FILE_REC.IO,C,C)
      TEST = STREAM(FILE_REC.HIS,C,C)
      FOUND = 1
      RENAME 'FILE_REC.IO *.DIO'
    END
    PATH = STREAM(INFO_NDS.IO,C,'QUERY EXISTS')
    IF PATH < >"THEN DO
      TEST = STREAM(INFO_NDS.IO,C,0)
      PATH = STREAM(INFO_NDS.HIS,C,'QUERY EXISTS')
      IF PATH = "THEN
        TEST = STREAM(INFO_NDS,HIS,C,0)
      OBJ_TYPE = 10041
      OBJ_NAME = 20
      CALL BUILDER
      TEST = STREAM(INFO_NDS.IO,C,C)
      TEST = STREAM(INFO_NDS.HIS,C,C)
```

FIG.3H

```
      FOUND = 1
      RENAME 'INFO_NDS.IO *.DIO'
   END
   PATH = STREAM(LIBRARY.IO,C,'QUERY EXISTS')
   IF PATH < >"THEN DO
      TEST = STREAM(LIBRARY.IO,C,O)
      PATH = STREAM(LIBRARY.HIS,C,'QUERY EXISTS')
      IF PATH = "THEN
         TEST = STREAM(LIBRARY.HIS,C,O)
      OBJ_TYPE = 10019
      OBJ_NAME = 21
      CALL BUILDER
      TEST = STREAM(LIBRARY.IO,C,C)
      TEST = STREAM(LIBRARY.HIS,C,C)
      FOUND = 1
      RENAME 'LIBRARY.IO *.DIO'
   END
   PATH = STREAM(MECHISM.IO,C,'QUERY EXISTS')
   IF PATH < >"THEN DO
      TEST = STREAM(MECHISM.IO,C,O)
      PATH = STREAM(MECHISM.HIS,C,'QUERY EXISTS')
      IF PATH = "THEN
         TEST = STREAM(MECHISM.HIS,C,O)
      OBJ_TYPE = 10028
      OBJ_NAME = 22
      CALL BUILDER
      TEST = STREAM(MECHISM.IO,C,C)
      TEST = STREAM(MECHISM.HIS,C,C)
      FOUND = 1
      RENAME 'MECHISM.IO *.DIO'
   END
   PATH = STREAM(MOD_SRC.IO,C,'QUERY EXISTS')
   IF PATH < >"THEN DO
      TEST = STREAM(MOD_SRC.IO,C,O)
      PATH = STREAM(MOD_SRC.HIS,C,'QUERY EXISTS')
      IF PATH = "THEN
         TEST = STREAM(MOD_SRC.HIS,C,O)
      OBJ_TYPE = 10038
      OBJ_NAME = 23
      CALL BUILDER
      TEST = STREAM(MOD_SRC.IO,C,C)
      TEST = STREAM(MOD_SRC.HIS,C,C)
      FOUND = 1
      RENAME 'MOD_SRC.IO *.DIO'
   END
   PATH = STREAM(MODULE.IO,C,'QUERY EXISTS')
```

FIG.31

```
IF PATH < >"THEN DO
   TEST = STREAM(MODULE.IO,C,0)
   PATH = STREAM(MODULE.HIS,C,'QUERY EXISTS')
   IF PATH = "THEN
      TEST = STREAM(MODULE.HIS,C,0)
   OBJ_TYPE = 10015
   OBJ_NAME = 24
   CALL BUILDER
   TEST = STREAM(MODULE.IO,C,C)
   TEST = STREAM(MODULE.HIS,C,C)
   FOUND = 1
   RENAME 'MODULE.IO *.DIO'
END
PATH = STREAM(PROJECT.IO,C,'QUERY EXISTS')
IF PATH < >"THEN DO
   TEST = STREAM(PROJECT.IO,C,0)
   PATH = STREAM(PROJECT.HIS,C,'QUERY EXISTS')
   IF PATH = "THEN
      TEST = STREAM(PROJECT.HIS,C,0)
   OBJ_TYPE = 10027
   OBJ_NAME = 25
   CALL BUILDER
   TEST = STREAM(PROJECT.IO,C,C)
   TEST = STREAM(PROJECT.HIS,C,C)
   FOUND = 1
   RENAME 'PROJECT.IO *.DIO'
END
PATH = STREAM(PSB.IO,C,'QUERY EXISTS')
IF PATH < >"THEN DO
   TEST = STREAM(PSB.IO,C,0)
   PATH = STREAM(PSB.HIS,C,'QUERY EXISTS')
   IF PATH = "THEN
      TEST = STREAM(PSB.HIS,C,0)
   OBJ_TYPE = 10034
   OBJ_NAME = 26
   CALL BUILDER
   TEST = STREAM(PSB.IO,C,C)
   TEST = STREAM(PSB.HIS,C,C)
   FOUND = 1
   RENAME 'PSB.IO *.DIO'
END
PATH = STREAM(RELATION.IO,C,'QUERY EXISTS')
IF PATH < >"THEN DO
   TEST = STREAM(RELATION.IO,C,0)
   PATH = STREAM(RELATION.HIS,C,'QUERY EXISTS')
   IF PATH = "THEN
```

FIG.3J

```
      TEST = STREAM(RELATION.HIS,C,0)
   OBJ_TYPE = 10053
   OBJ_NAME = 27
   CALL BUILDER
   TEST = STREAM(RELATION.IO,C,C)
   TEST = STREAM(RELATION.HIS,C,C)
   FOUND = 1
   RENAME 'RELATION.IO *.DIO'
END
PATH = STREAM(REL_DB.IO,C,'QUERY EXISTS')
IF PATH < >"THEN DO
   TEST = STREAM(REL_DB.IO,C,0)
   PATH = STREAM(REL_DB.HIS,C,'QUERY EXISTS')
   IF PATH = "THEN
      TEST = STREAM(REL_DB.HIS,C,0)
   OBJ_TYPE = 10055
   OBJ_NAME = 28
   CALL BUILDER
   TEST = STREAM(REL_DB.IO,C,C)
   TEST = STREAM(REL_DB.HIS,C,C)
   FOUND = 1
   RENAME 'REL_DB.IO *.DIO'
END
PATH = STREAM(SCREEN.IO,C,'QUERY EXISTS')
IF PATH < >"THEN DO
   TEST = STREAM(SCREEN.IO,C,0)
   PATH = STREAM(SCREEN.HIS,C,'QUERY EXISTS')
   IF PATH = "THEN
      TEST = STREAM(SCREEN.HIS,C,0)
   OBJ_TYPE = 10017
   OBJ_NAME = 29
   CALL BUILDER
   TEST = STREAM(SCREEN.IO,C,C)
   TEST = STREAM(SCREEN.HIS,C,C)
   FOUND = 1
   RENAME 'SCREEN.IO *.DIO'
END
PATH = STREAM(SEGMENT.IO,C,'QUERY EXISTS')
IF PATH < >"THEN DO
   TEST = STREAM(SEGMENT.IO,C,0)
   PATH = STREAM(SEGMENT.HIS,C,'QUERY EXISTS')
   IF PATH = "THEN
      TEST = STREAM(SEGMENT.HIS,C,0)
   OBJ_TYPE = 10032
   OBJ_NAME = 30
   CALL BUILDER
```

FIG3K

```
      TEST = STREAM(SEGMENT.IO,C,C)
      TEST = STREAM(SEGMENT.HIS,C,C)
      FOUND = 1
      RENAME 'SEGMENT.IO *.DIO'
   END
   PATH = STREAM(SEQ_PROC.IO,C,'QUERY EXISTS')
   IF PATH < >"THEN DO
      TEST = STREAM(SEQ_PROC.IO,C,0)
      PATH = STREAM(SEQ_PROC.HIS,C,'QUERY EXISTS')
      IF PATH = "THEN
         TEST = STREAM(SEQ_PROC.HIS,C,0)
      OBJ_TYPE = 10004
      OBJ_NAME = 31
      CALL BUILDER
      TEST = STREAM(SEQ_PROC.IO,C,C)
      TEST = STREAM(SEQ_PROC.HIS,C,C)
      FOUND = 1
      RENAME 'SEQ_PROC.IO *.DIO'
   END
   TEST = STREAM(OI.EXP,C,C)
   TEST = STREAM(TI.EXP,C,C)
   SAY 'BRIDGE COMPLETE'
   IF FOUND < > 1 THEN
      SAY 'NO FILES FOUND FOR PROCESSING'
   ELSE
      ERASE '*.DIO'
   EXIT
   /******************************************************************/
   /* BUILDER routine parses an object file into object names and    */
   /* object definitions.  The disected pieces are written to a      */
   /* new file in a format which can be imported into ADW.           */
   /* Sub-routine READER is called to read one line of an object     */
   /* file.                                                           */
   /*                                                                 */
   /* The lines are scanned to deterrmine if a D: or a C: are found  */
   /* which signifies either a definition or a comment respectively.*/
   /*****************************************************************
   BUILDER:
   FIRSTIME = 'Y'       /* SET A FIRST TIME THRU FLAG */
   DO FOREVER
      CALL READER                      /* READ IN THE NEXT LINE */
      PARSE VAR TEMPA DEFCODE +2 REST1
      PARSE VAR TEMPA MESSAGE +6 REST2
      IF MESSAGE = '_____'THEN DO
         CALL READER           /* READ IN THE NAME LINE */
         TOKEN = TOKEN + 1
```

FIG.3L

```
        NAMEA = '"'
        NAMEB = LEFT(TEMPA,32)
        NAME  = NAMEA||NAMEB||NAMEA
        OUTREC = TOKEN||' '||OBJ_TYPE||' '||NAME
        CALL LINEOUT OI.EXP,OUTREC
        CALL READER         /* READ IN THE NEXT_____LINE */
        TEMPA = ''          /* CLEAR TEMPA OF LAST LINE READ IN */
        DEFCODE = ''        /* CLEAR DEFCODE OF LAST LINE READ IN */
        NUM = 100001
        FIRSTIME = 'N'
        END
    ELSE IF DEFCODE = 'D:' THEN DO
        PROP_CODE = 30076
        DEFNB = LEFT(REST1,72) /*DO THIS TO PAD THE DEFN WITH BLANKS*/
        NUM = 100001
        CALL WRITEIT
        END
      ELSE IF DEFCODE = 'C:' THEN DO
         PROP_CODE = 30077
         DEFNB = LEFT(REST1,72)/*DO THIS TO PAD THE DEFN WITH BLANKS*/
         NUM = 100001
         CALL WRITEIT
         IF MRC = 0 THEN LEAVE*/
         END
        ELSE IF FIRSTIME = 'N' THEN DO
            DEFNB = LEFT(TEMPA,72)
            CALL WRITEIT
            END
    IF MRC < > 1 THEN LEAVE
END
RETURN
/****************************************************************/
/* WRITEIT is a small routine used to uniformly write out the   */
/* ADW records to the TI.EXP file                               */
/****************************************************************/
WRITEIT:
   GOODNUM = RIGHT(NUM,5)
   DEFNA = '"'
   DEFN = DEFNA||DEFNB||DEFNA
   DEFREC = TOKEN||' '||PROP_CODE||' '||GOODNUM||' '||DEFN
   CALL LINEOUT TI.EXP,DEFREC
   NUM = NUM + 1
RETURN
/****************************************************************/
/* READER routine reads one line from an object file. The object*/
/* file used is determined by the contents of the OBJ_NAME      */
```

FIG.3M

```
/* variable which is determined in the MAIN routine.          */
/*****************************************************************/
READER:
 SELECT
    WHEN OBJ_NAME = 1 THEN DO
     TEMPA = LINEIN(LOCATION.IO)
     MRC = LINES(LOCATION.IO)
     CALL LINEOUT LOCATION.HIS,TEMPA
    END
    WHEN OBJ_NAME = 2 THEN DO
     TEMPA = LINEIN(ORG_UNIT.IO)
     MRC = LINES(ORG_UNIT.IO)
     CALL LINEOUT ORG_UNIT.HIS,TEMPA
    END
    WHEN OBJ_NAME = 3 THEN DO
     TEMPA = LINEIN(FUNCTION.IO)
     MRC = LINES(FUNCTION.IO)
     CALL LINEOUT FUNCTION.HIS,TEMPA
    END
    WHEN OBJ_NAME = 4 THEN DO
     TEMPA = LINEIN(PROCESS.IO)
     MRC = LINES(PROCESS.IO)
     SAY 'MRC = 'MRC
     SAY 'TEMPA = 'TEMPA
     CALL LINEOUT PROCESS.HIS,TEMPA
    END
    WHEN OBJ_NAME = 5 THEN DO
     TEMPA = LINEIN(INPUTS.IO)
     MRC = LINES(INPUTS.IO)
     CALL LINEOUT INPUTS.HIS,TEMPA
    END
    WHEN OBJ_NAME = 6 THEN DO
     TEMPA = LINEIN(DATA_FLS.IO)
     MRC = LINES(DATA_FLS.IO)
     CALL LINEOUT DATA_FLS.HIS,TEMPA
    END
    WHEN OBJ_NAME = 7 THEN DO
     TEMPA = LINEIN(GOALS.IO)
     MRC = LINES(GOALS.IO)
     CALL LINEOUT GOALS.HIS,TEMPA
    END
    WHEN OBJ_NAME = 8 THEN DO
     TEMPA = LINEIN(PROBLEM.IO)
     MRC = LINES(PROBLEM.IO)
     CALL LINEOUT PROBLEM.HIS,TEMPA
    END
```

FIG.3N

```
WHEN OBJ_NAME = 9 THEN DO
   TEMPA = LINEIN(SUBJECT.IO)
   MRC = LINES(SUBJECT.IO)
   CALL LINEOUT SUBJECT.HIS,TEMPA
END
WHEN OBJ_NAME = 10 THEN DO
   TEMPA = LINEIN(EXTERNAL.IO)
   MRC = LINES(EXTERNAL.IO)
   CALL LINEOUT OUTPUTS.HIS,TEMPA
END
WHEN OBJ_NAME = 11 THEN DO
   TEMPA = LININ(OUTPUTS.IO)
   MRC = LINES(OUTPUTS.IO)
   CALL LINEOUT OUTPUTS.HIS,TEMPA
END
WHEN OBJ_NAME = 12 THEN DO
   TEMPA = LINEIN(CRASS.IO)
   MRC = LINES(CRASS.IO)
   CALL LINEOUT CRASS.HIS,TEMPA
END
WHEN OBJ_NAME = 13 THEN DO
   TEMPA = LINEIN(CRFAC.IO)
   MRC = LINES(CRFAC.IO)
   CALL LINEOUT CRFAC.HIS,TEMPA
END
WHEN OBJ_NAME = 14 THEN DO
   TEMPA = LINEIN(DATA_COL.IO)
   MRC = LINES(DATA_COL.IO)
   CALL LINEOUT DATA_COL.HIS,TEMPA
END
WHEN OBJ_NAME = 15 THEN DO
   TEMPA = LINEIN(DATA_STR.IO)
   MRC = LINES(DATA_STR.IO)
   CALL LINEOUT DATA_STR.HIS,TEMPA
END
WHEN OBJ_NAME = 16 THEN DO
   TEMPA = LINEIN(DBD.IO)
   MRC = LINES(DBD.IO)
   CALL LINEOUT DBD.HIS,TEMPA
END
WHEN OBJ_NAME = 17 THEN DO
   TEMPA = LINEIN(ENTITY.IO)
   MRC = LINES(ENTITY.IO)
   CALL LINEOUT ENTITY.HIS,TEMPA
END
WHEN OBJ_NAME = 18 THEN DO
```

FIG.30

```
  TEMPA = LINEIN(FILE_DB.IO)
  MRC = LINES(FILE_DB.IO)
   CALL LINEOUT FILE_DB.HIS,TEMPA
END
WHEN OBJ_NAME = 19 THEN DO
  TEMPA = LINEIN(FILE_REC.IO)
  MRC = LINES(FILE_REC.IO)
   CALL LINEOUT FILE_REC.HIS,TEMPA
END
WHEN OBJ_NAME = 20 THEN DO
  TEMPA = LINEIN(INFO_NDS.IO)
  MRC = LINES(INFO_NDS.IO)
   CALL LINOUT INFO_NDS.HIS,TEMPA
END
WHEN OBJ_NAME = 21 THEN DO
  TEMPA = LINEIN(LIBRARY.IO)
  MRC = LINES(LIBRARY.IO)
   CALL LINEOUT LIBRARY.HIS,TEMPA
END
WHEN OBJ_NAME = 22 THEN DO
  TEMPA = LINEIN(MECHISM.IO)
  MRC = LINES(MECHISM.IO)
   CALL LINEOUT MECHISM.HIS,TEMPA
END
WHEN OBJ_NAME = 23 THEN DO
  TEMPA = LINEIN(MOD_SRC.IO)
  MRC = LINES(MOD_SRC.IO)
   CALL LINEOUT MOD_SRC.HIS,TEMPA
END
WHEN OBJ_NAME = 24 THEN DO
  TEMPA = LINEIN(MODULE.IO)
  MRC = LINES(MODULE.IO)
   CALL LINEOUT MODULE.HIS,TEMPA
END
WHEN OBJ_NAME = 25 THEN DO
  TEMPA = LINEIN(PROJECT.IO)
  MRC = LINES(PROJECT.IO)
   CALL LINEOUT PROJECT.HIS,TEMPA
END
WHEN OBJ_NAME = 26 THEN DO
  TEMPA = LINEIN(PSB.IO)
  MRC = LINES(PSB.IO)
   CALL LINEOUT PSB.HIS,TEMPA
END
WHEN OBJ_NAME = 27 THEN DO
  TEMPA = LINEIN(RELATION.IO)
```

FIG.3P

```
      MRC = LINES(RELATION.IO)
      CALL LINEOUT RELATION.HIS,TEMPA
    END
    WHEN OBJ_NAME = 28 THEN DO
     TEMPA = LINEIN(REL_DB.IO)
     MRC = LINES(REL_DB.IO)
      CALL INEOUT REL_DB.HIS,TEMPA
    END
    WHEN OBJ_NAME = 29 THEN DO
     TEMPA = LINEIN(SCREEN.IO)
     MRC = LINES(SCREEN.IO)
     CALL LINEOUT SCREEN.HIS,TEMPA
    END
    WHEN OBJ_NAME = 30 THEN DO
     TEMPA = LINEIN(SEGMENT.IO)
     MRC = LINES(SEGMENT.IO)
     CALL LINEOUT SEGMENT.HIS,TEMPA
    END
    WHEN OBJ_NAME = 31 THEN DO
     TEMPA = LINEIN(SEQ_PROC.IO)
     MRC = LINES(SEQ_PROC.IO)
     CALL LINEOUT SEQ_PROC.HIS,TEMPA
    END
  END
RETURN
```

FIG.3Q

INTEGRATED SOFTWARE DEVELOPMENT SYSTEM INCLUDING GROUP DECISION SUPPORT SUBSYSTEM, APPLICATION DEVELOPMENT SUBSYSTEM, AND BRIDGE SUBSYSTEM THEREBETWEEN

FIELD OF THE INVENTION

The invention, while not necessarily being so limited, relates generally to process management and the development of software. More specifically, the invention relates to the use of group decision support systems (such as IDEF0, Integrated Computer Aided Manufacturing Definition Level Zero) and methods to define needs, as software needs, and the integration of the group decision support definition process into the computer assisted software engineering environment through a bridge linking the group decision support system and the computer assisted software engineering environment.

BACKGROUND OF THE INVENTION

Computer aided software engineering (CASE) is a powerful software development tool, with the potential of reducing software development backlogs and software maintenance. However, as pointed out by Chang-Yang Lin and Chen-Hua Chung, in "End-User Computing In A CASE Environment," *J.Info.Syst.Manage.*, Vol.8, No. 2 pp. 17–21 (1991), CASE tools are still used primarily by information science professionals, rather then by end-users. This is a serious shortcoming of CASE tools, because as new conditions and opportunities arise, the end-users are the best judges of end-user needs and ways of doing business. CASE tools can not reach their full potential without significant end-user involvement.

In this regard, Lin and Chung posit that CASE is a form of Group Decision Support System (GDSS), in that end-users can participate in the CASE process. End-user participation in the CASE process and environment requires structuring the CASE environment to support end-user applications development.

CASE is an environment of integrated tools that automate the systems development process. Ultimately, Lin and Chung argue that CASE should be able to capture requirements in natural English statements and automatically generate systems that meet these requirements. However, they point out that this is not an easily attainable goal. This is because CASE tools only automate limited portions of the software life cycles, i.e., code generators and diagramming tools.

In this regard, the CASE environment can be regarded as a set of software tools that provide some degree of automation to one or more phases of the system life cycle, e.g., code generation. CASE accomplishes this through a central repository, rules, reusable software, and tools that support systems development. Exemplary systems development tools include, solely by way of exemplification and not limitation include:

1. Diagramming tools for analysis and design of an enterprise's data, activities, and interactions.
2. Dictionary tools for recording, maintaining, and reporting system details.
3. Prototyping tools that support, for example, user interfaces, inputs, dialogs, outputs, forms, and reports through the use of screen generators, report generators, and menu generators. These prototyping tools may also be the outputs of the CASE system.
4. Code construction tools including code generators to automate conversion of specifications into high level languages and data bases.

To be noted is that the set of CASE tools encourages user-developer interaction by its support of diagramming and programming tools. This gives rise to Joint Application Development (JAD). JAD is an extension of CASE, relying on interviewing and user understandable user interfaces.

Prototyping is the normal form of end-user interface to the CASE environment. Even this level of interface requires heavy Information Scientist involvement. In a prototyping environment, users use, for example, entity-relationship diagrams and process hierarchy diagrams to produce a graphic representation of a proposed system. End users may also use prototyping tools to lay out screens and reports, and define tables and reports. These activities may involve GDSS methodology.

The output of the end-user prototyping process is not a direct input to the CASE environment. CASE is still, primarily an Information Science professional tool. Lin and Chung do not propose an interface to the end-user. To the contrary, they propose an new generation of CASE tools and environments. Lin and Chung propose that this new generation of CASE tools start from a task oriented, icon based system, supporting sophisticated application generation through the direct manipulation of icons representing reusable codes. This new CASE environment would combine prototyping with a simplified and standardized, user friendly, graphical user interface, and would have built in expert systems.

Another end-user software development system is the Information Center Expert (ICE), which is described, for example, by Ajay S. Vinze, Douglas Ro Vogel, and Jay F. Nunamaker, Jr., in "Validation of a Knowledge-Based System: The ICE Case," *Proceedings of the Twenty-Third Annual Hawaii International Conference On Systems Sciences*, 1990, Volume 3, pp. 239–246. ICE is an expert system that is designed to allow an end user to develop application specific software. It does this through a graphical user interface, and four subsystems:

1. A profiling subsystem that collects information necessary to generate a user profile and a problem profile.
2. A requirement—software matching subsystem that initiates an algorithm to match the user profile and the problem profile with a profile of the software tools supported by ICE.
3. A tracking subsystem that captures the "consultation" results.
4. A maintenance subsystem that maintains information about tool resources and profiles.

ICE is an expert system based "matching" system, that matches requirements with available software tools and packages.

The goal of the various systems is to empower the software end-user to develop the end-use specific application software. The existing systems fail to accomplish this empowerment. This is because they fail to provide a user driven application development environment, in which an end-user group defines its software needs and develops software to fill those user-defined needs.

The above described systems, i.e., expert systems and enhanced CASE environments, while being strong attempts to empower non-experts, i.e., end users, to complete the steps of creating application software in the same way that an expert would, require an high level of software development expertise on the part of the end-user. Thus, they fail to take advantage of the end-user's superior knowledge of the task specific application software needs.

Nor do the above systems even attempt to integrate group decision support methods with computer assisted software engineering methods in a single, interactive, synergistic system.

Thus, a clear need exists for an interactive, integrated group decision support system with a computer assisted software engineering system.

OBJECTS OF THE INVENTION

It is a primary object of the invention to empower end-users to develop their own application specific software.

It is another object of the invention to facilitate this empowerment in a group setting.

It is a further primary object of the invention to provide a user driven application development environment, in which the end-user group defines its software needs and develops software to fill those user-defined needs.

In this regard, it is a still further primary object of the invention to empower non-experts, i.e., end users, to complete the steps of creating application software in the same way that an expert would, thereby taking advantage of the end-user's superior knowledge of the task specific application software needs.

It is a further object of the invention to integrate group decision support methods with computer assisted software engineering methods.

It is a still further object of the invention to integrate group decision support methodology and the application development process into a single, interactive, synergistic system.

SUMMARY OF THE INVENTION

These and other objects of the invention are obtained by the integrated software development system of the invention, including an integrated group decision support subsystem, an integrated application development subsystem, and an integrated bridge subsystem providing a software link between the group decision support subsystem and the application development subsystem. The application development sub-system may be a CASE toolkit or workbench, or a rules repository.

The integrated system provides a user driven application development environment, in which the end-user group defines its software needs and develops software to fill those user-defined needs. In this way a non-expert can complete the steps of creating application software in the same way that an expert would. This is because the end-user knows the task specific needs, e.g., application software needs or rule repository needs, better than an outside developer. More particularly, the integrated system back integrates the application development sub-system, used to develop the application software, e.g., a computer assisted software engineering workbench and toolkit, or a rules repository, into the group decision support system used to define the software needs.

The integrated system is particularly useful for creating enterprise specific process models and writing software, including rules repositories, based on the enterprise-specific process model. The group decision support subsystem is used by the participants, e.g., end-users, for creating and ordering a process model according to a protocol. Using this protocol, the bridge sub-system transforms the output of the group decision support subsystem into the input of the application development subsystem. The application development subsystem is used for writing software or rules repositories based on the bridge transformed output of the group decision support subsystem.

The group decision support subsystem of the invention may be any standard group decision support subsystems. It is characterized by having one or more of the following group decision support tools:

(1). Electronic brainstorming for facilitating substantially simultaneous and anonymous information collection, with concomitant exchange of ideas and comments about the collected information from the participants.

(2). Issue Analysis and Idea Organization capability. This allows the participants to group, categorize and define issues and ideas from the collected information.

(3). Voting Application capability. This facilitates ranking and prioritization of issues and ideas.

(4). Topic Commenter capability to facilitate viewing and comment on the issues and ideas.

(5). A dictionary means that allows participants to define words that are ambiguous.

(6). Specific software for compatibilizing the output of the group decision support system to the input of either the bridge subsystem or the application development subsystem.

The application development subsystem includes one or more of the following tools:

(1). An Association Matrix tool that allows users to describe relationships between objects. This can provide a matrix output or a tabular output.

(2). A Decomposition Diagrammer tool that allows users to decompose objects into greater levels of detail.

(3). A Property Matrix Diagrammer tool that allows users to describe the properties of objects.

(4). An Entity Relationship Diagrammer tool that allows users to describe data requirements the enterprise as well as the data requirements of and between objects within the enterprise.

(5). A Data Flow Diagrammer Tool that allows users to identify data flowing into, out of, and between objects.

(6). A rules repository.

The group decision support subsystem and the application development subsystem of the integrated system are joined by a bridge subsystem. The bridge subsystem converts the output of the group decision support subsystem to compatible input of the application development subsystem.

THE FIGURES

The invention may be understood by reference to the FIGURES appended hereto.

FIG. 1 is a schematic view of the integrated system of the invention.

FIG. 2 is a block diagram of the integrated system of the invention.

FIG. 3, which is made up of 13 sheets, FIGS. 3A through 3M, is a REXX listing of the bridge subsystem of the invention.

DETAILED DESCRIPTION OF THE INVENTION

The integrated software development system of the invention is shown in the FIGURES. The system 1 includes an integrated group decision support subsystem, 11, an integrated application development subsystem, 21, and an integrated bridge subsystem, 31, providing a software link between the group decision support subsystem, 11, and the application development subsystem, 21.

The group decision support subsystem, 11, of the invention may be any standard group decision support subsystems. The preferred GDSS's for end user software development increase the over quantity of effort put forward by the team members, while focusing the efforts of the end-user team members toward the software product, This is done in an environment that increases consensus reaching while decreasing decision making time.

One suitable GDSS is "Team Focus," a facilitator led, GDSS. "Team Focus" uses desktop computers, connected through a local area network. It allows participants to anonymously generate, exchange, categorize, and prioritize ideas, and formulate plans and policies based on the ideas. As described below, "Team Focus" has electronic brainstorming, issue analysis/idea organization, voting, topic commenter, alternative evaluation, policy formation, group dictionary, and questionnaire tools.

"Team Focus," like other suitable GDSS environment tools and environments, is characterized by having one or more of the following group decision support tools:

(1). Electronic brainstorming for facilitating substantially simultaneous and anonymous information collection, with concomitant exchange of ideas and comments about the collected information from the participants.

(2). Issue Analysis and Idea Organization capability. This allows the participants to group, categorize and define issues and ideas from the collected information.

(3). Voting Application capability. This facilitates ranking and prioritization of issues and ideas.

(4). Topic Commenter capability to facilitate viewing and comment on the issues and ideas.

(5). A dictionary means that allows participants to define words that are ambiguous.

(6). Specific software for compatibilizing the output of the group decision support system to the input of either the bridge subsystem or the application development subsystem.

In a preferred exemplification of the invention, the application development subsystem, 21, is a CASE workbench subsystem to support the analysis and design of a software system. This is generally accomplished through support of graphical notations, tools and concepts. Exemplary is Structured Design. The CASE environment allows for continuous and smooth transition from the planning stage carried out in the GDSS subsystem, 11, to the construction stage of the application, with data sharing, consistency, and compatibility between the CASE tools The application development susbsystem, 21, includes one or more of the following tools:

(1). An Association Matrix tool that allows users to describe relationships between objects. This can provide a matrix output or a tabular output.

(2). A Decomposition Diagrammer tool that allows users to decompose objects into greater levels of detail.

(3). A Property Matrix Diagrammer tool that allows users to describe the properties of objects.

(4). An Entity Relationship Diagrammer tool that allows users to describe data requirements the enterprise as well as the data requirements of and between objects within the enterprise.

(5). A Data Flow Diagrammer Tool that allows users to identify data flowing into, out of, and between objects.

(6). A rules repository.

The group decision support subsystem, 11, and the application development subsystem, 21, of the integrated system, 1, are joined by a bridge subsystem, 31. The bridge subsystem, 31, converts the output of the group decision support subsystem, 11, to compatible input of the application development subsystem, 21.

The bridge subsystem, 31, opens the output file of the group decision support subsystem, 11, and also opens the input file of the application development subsystem, 21. The bridge susbsystem, 21, determines the file contents, that is, does the file contain data information or process information ? Next, the bridge subsystem removes the software system delimiters and protocols inserted by the group decision support system, 11. The bridge subsystem, 31, then concatenates token numbers to name data and property codes to support data. These data type are used by the bridge subsystem, 31, to build CASE compatible output files, and to write to the files.

The bridge subsystem, 31, integrates the group decision support subsystem, 11, and the application development subsystem, 21, into an interactive, synergistic system, 1.

FIG. 3 shows a REXX language listing of one exemplification of the bridge subsystem of the invention. While FIG. 3 shows a REXX language listing, it is, of course, to be understood that any language, as C, PASCAL, FORTRAN, BASIC, or the like may be used.

The group decision support subsystem, 11, is used by the participants, e.g., end-users, for creating and ordering a process model according to a protocol. Using this protocol, the bridge sub-system, 31, transforms the output of the group decision support subsystem, 11, into the input of the application development subsystem, 21. The application development subsystem, 21, is used for writing software based on the bridge transformed output of the group decision support subsystem, 11.

Thus, according to the method of the invention there is provided a user driven application development environment, in which the end-user group defines its software needs and develops software to fill those user-defined needs. The integrated system of the invention empowers non-experts, i.e., end users, to complete the steps of creating application software in a Group Decision Support System environment in the same way that an expert would. This is because the end-user knows the task specific application software needs better than an outside developer.

More particularly, utilizing the bridge subsystem, the integrated system back integrates the application development sub-system, used to develop the application software, e.g., a computer assisted software engineering workbench and toolkit or a rules repository, into the group decision support system used to define the software needs. Thus, the integrated system of the invention expedites creating enterprise specific process models and writing software based on the enterprise-specific process model.

While the invention has been described with respect to certain preferred embodiments and exemplifications thereof, it is not intended to limit the scope of the invention thereby, but solely by the claims appended hereto.

We claim:

1. An integrated system for creating a process model and writing software based on the process model, including a group decision support subsystem for creating and ordering a process model according to a protocol, an application development subsystem for writing software based on the output of the group decision support subsystem and a bridge sub-system therebetween for converting output of the group decision support subsystem into input of the application development subsystem, wherein:

a. said group decision support subsystem comprises one or more of:
   (1). means for substantially simultaneously and anonymously collecting information, and exchanging ideas and comments about the said information from participants;
   (2). issue analysis and idea organization means for the participants to group, categorize and define issues and ideas from the collected information;
   (3). voting application means and alternative evaluation means for the participants to rank and prioritize issues and ideas;
   (4). topic commenter means for participants to view and comment upon issues and ideas; and
   (5). dictionary means;

b. said application development subsystem comprises rules repository means; and c. said bridge subsystem comprises means to convert the output of the group decision support subsystem to compatible input of the application development subsystem, including:
   (1). means for opening output of the group decision support subsystem and scanning directories thereof for object files;
   (2). means for creating and opening initially empty input files of the application development subsystem;
   (3). means for parsing an object file output of the group decision support system into object names and object definitions to determine the file contents of the group decision support subsystem output file, and thereafter writing the dissected object names and object definitions into application development subsystem files;
   (4). means for building application development subsystem compatible files and writing the application development subsystem compatible files to the application development subsystem, comprising:
      i. means to remove the software system delimiters and protocols inserted by the group decision support system;
      ii. means to concatenate token numbers to name data and property codes to support data; and
      iii. means for uniformly writing out the application development subsystem files.

* * * * *